United States Patent [19]

Harashima et al.

[11] Patent Number: 5,320,796
[45] Date of Patent: Jun. 14, 1994

[54] METHOD FOR THE PREPARATION OF POWDER MIXTURES

[75] Inventors: Asao Harashima, Tokyo; Kaoru Kunimatsu, Fukui; Atsushi Sasaki; Ryuji Tachibana, both of Chiba, all of Japan

[73] Assignee: Dow Corning Toray Silicone Co., Ltd., Tokyo, Japan

[21] Appl. No.: 55,483

[22] Filed: Apr. 29, 1993

[30] Foreign Application Priority Data

Apr. 30, 1992 [JP] Japan ................. 3-111285

[51] Int. Cl.⁵ .............................................. B29B 7/42
[52] U.S. Cl. ............................ 264/349; 264/122; 264/202; 264/211.21; 264/211.23; 366/82; 366/85
[58] Field of Search ............ 264/349, 211.23, 211.21, 264/202, 122, 118; 425/207, 209, 205, 206; 366/85, 84, 82, 76

[56] References Cited

U.S. PATENT DOCUMENTS

| 2,333,786 | 11/1943 | Hessen ................. | 264/349 |
| 2,469,999 | 5/1949 | Stober ................. | 425/209 |
| 2,705,131 | 3/1955 | Ross et al. ............ | 425/207 |
| 2,813,302 | 11/1957 | Beck ................... | 264/349 |
| 3,957,210 | 5/1976 | Dürr ................... | 425/207 |
| 4,067,553 | 1/1978 | Yamoaka ............... | 366/82 |
| 4,117,073 | 9/1978 | Koch et al. ............ | 264/349 |
| 4,408,887 | 10/1983 | Yamaoka ................ | 366/75 |
| 4,474,473 | 10/1984 | Higuchi et al. ......... | 366/85 |
| 4,726,908 | 2/1988 | Kruse et al. ........... | 264/122 |
| 4,871,498 | 10/1989 | Nakamura et al. ........ | 264/115 |
| 5,044,757 | 9/1991 | Dienst ................. | 264/349 |

FOREIGN PATENT DOCUMENTS

| 54-024743 | 3/1979 | Japan . |
| 55-041139 | 10/1980 | Japan . |
| 61-034039 | 2/1986 | Japan . |
| 62-007378 | 1/1987 | Japan . |
| 62-007379 | 1/1987 | Japan . |
| 2000092 | 1/1990 | Japan . |

Primary Examiner—Jeffery R. Thurlow
Attorney, Agent, or Firm—Jim L. DeCesare

[57] ABSTRACT

A method for producing powder mixtures capable of inducing an even more intimate, microhomogeneous intermixing in a heterogeneous powder composed of at least two types of powders. The method is effective even for the mixing of an aggregable powder and a nonaggregable powder. According to the method, a heterogeneous powder composed of at least two type of powders that have been preliminarily mixed by stirring is introduced into an inlet while a rotating axle is turning and is axially transported within a cylinder by a screw. As the heterogeneous powder passes between rotating disks and fixed disks, it is subjected to a highly efficient mixing by compression and shear forces due to a sliding-shear action exerted between depressions and elevations installed on the opposing surfaces of the rotating disks and fixed disks. The mixture passes in sequence through multiple stages of the rotating and fixed disks. A powder mixture, which has been microhomogeneously interdispersed, is discharged from the outlet.

4 Claims, 1 Drawing Sheet

METHOD FOR THE PREPARATION OF POWDER MIXTURES

BACKGROUND OF THE INVENTION

The present invention relates to a method and apparatus for the preparation of powder mixtures by the intermixing/interdispersing to homogeneity of a heterogeneous powder including granulate powders comprising at least 2 different types of powders.

The properties of powders vary depending on their chemical structures. When two or more powders with different properties have been macroscopically and microscopically interdispersed to homogeneity the resulting powder mixture can be expected to have a uniform quality in each lot with respect to such factors as color uniformity. and the aggregation of one type of powder. Thus, such a thorough mixing performance will give continuously stable properties. These highly interdispersed powder mixtures can be effectively used in such fields as cosmetics, pharmaceutical products, resin compositions, paints, inks, art supplies, decorative materials, perfumes, magnetic media, and medical supplies Methods known for mixing a heterogeneous powder comprising two or more different types of powders include mixing methods based on a stirring effect such as the Henschel mixer, Lodige mixer, and V-mixer, and mixing methods based principally on a shear effect such as a colloid mill, ball mill, motorized orbiting mortar and pestle, and roll mill.

However, these methods are limited in their ability to efficiently and continuously produce microhomogeneously interdispersed powder mixtures from an aggregable powder and a nonaggregable powder. In specific terms, in the case of color-critical applications such as paints, inks, and cosmetics, further improvements in product quality are strongly hindered by the occurrence of variations in color and luster when a powder mixture is used that has particular limitations on its interdispersity at the microscopic level. When an increase in product quality is sought using more vigorous conditions, shear mixing must be carried out for long periods of time, which unavoidably causes a sharp decline in production efficiency. In addition, organic powders become electrostatically charged during long-term mixing, and this causes the problem of re-aggregation.

SUMMARY OF THE INVENTION

The present invention takes as its object the introduction of a method for the preparation of powder mixtures that makes possible a more intimate microhomogeneous interdispersion of two or more different types of powders, even for the mixing of an aggregable powder and a nonaggregable powder.

Figure 1:
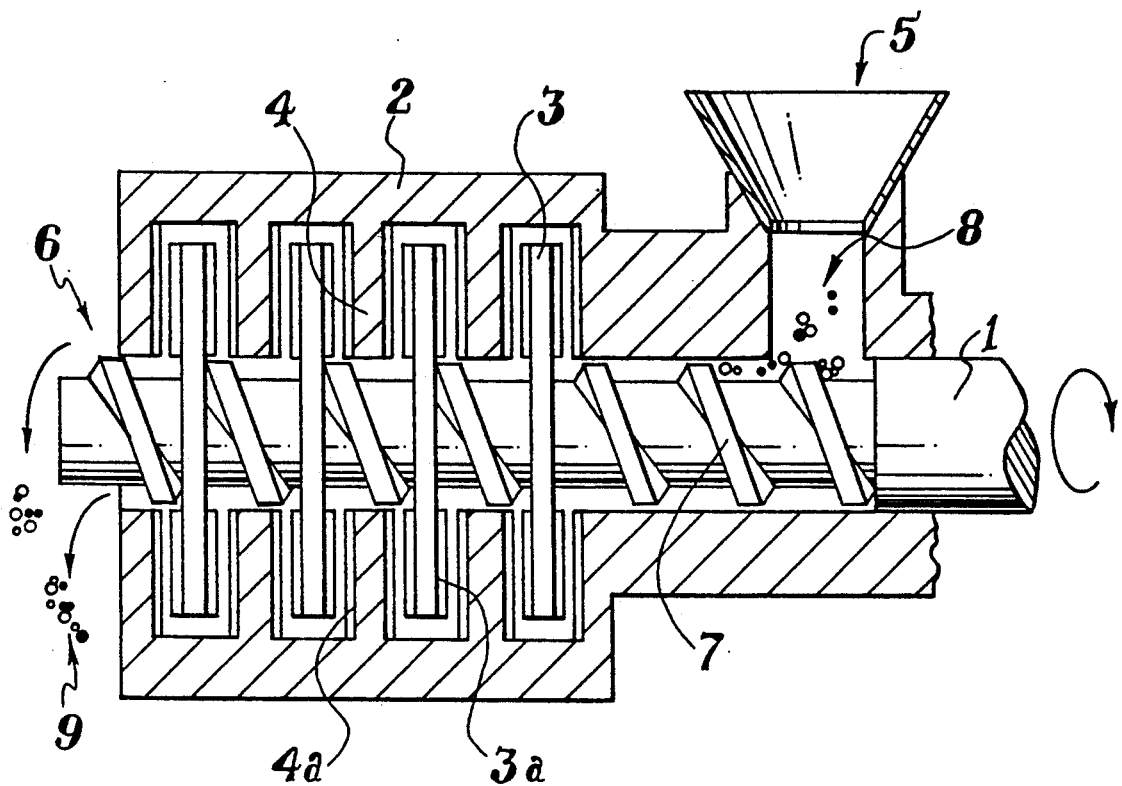
FIG. 1 is a cross section of the closed multistage sliding-shear extruder of the present invention.

Reference numerals in the three drawing figures correspond to the parts as follows. Reference numeral 1 is the rotating axle; 2 is the cylinder; 3 is the rotating disk; 3a and 4a are opposing surfaces of the rotating and fixed disks; 4 is the fixed disk; 5 is the powder inlet; 6 is the powder outlet; 7 is the transport screw; 8 is the heterogenous powder; 9 is the powder mixture; 31 and 41 are depressions: and 32 and 42 are elevations.

DETAILED DESCRIPTION OF THE INVENTION

The present invention's method for the preparation of powder mixtures is characterized in that a sliding-shear extruder is fabricated in which a transport-flighted rotating axle is inserted within a cylinder and there is installed on this rotating axle a multiple number of rotating disks spaced at intervals along the axle. Fixed disks are formed in said cylinder between adjacent rotating disks, and radially emanating depressions and elevations are formed on each of the opposing surfaces of the rotating and fixed disks.

A heterogeneous powder is preliminarily prepared by mixing at least two types of powder by stirring. The heterogeneous powder is supplied to the upstream side of the transport screw in the sliding-shear extruder and is thereafter subjected to mixing through the repetitive action in multiple stages of the sliding-shear force generated between the opposing surfaces of the rotating and fixed disks, while at the same time the mixture is transported axially by the transport screw.

Different types of powders including the combination of an aggregable powder and a nonaggregable powder can be interdispersed to a very high degree of microhomogeneity by using the above-described sliding-shear extruder equipped with multiple stages of fixed disk/rotating disk sliding-shear structures to mix two or more different types of powders that have preliminarily been macroscopically mixed by stirring.

The microhomogeneous interdispersion of a heterogeneous powder can be effectively achieved by the sliding-shear mixing that is obtained using a stone mortar. However, the inefficiency associated with the use of a stone mortar makes it ill-suited for industrial production. The present invention relates to the discovery that application of a closed multistage sliding-shear extruder which is currently in use for liquid-liquid and solid-liquid mixing to the mixing of a heterogeneous powder comprising two or more different types of powders results in an improvement in the microhomogeneous interdispersity of the powder mixture. Moreover, this also makes possible a smooth, troublefree mixing process even in the case of powders.

Figure 2:
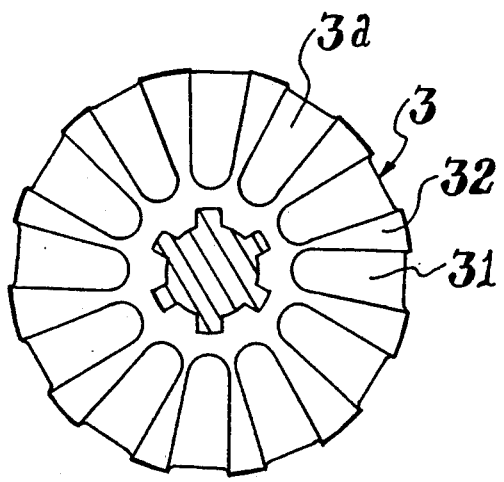
FIG. 2 is a side view of the rotating disk of FIG. 1.
Figure 3:
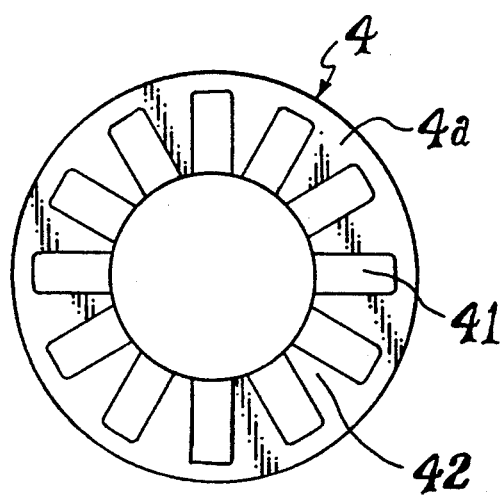
FIG. 3 is a side view of the fixed disk of FIG. 1.

FIG. 1 is a cross section of the closed multistage sliding-shear extruder. With reference to FIG. 1, rotating axle 1, which carries a transport screw 7 on its circumference, is horizontally inserted along the length of cylinder 2. Four rotating disks 3, spaced at intervals, are concentrically attached to the rotating axle 1. The interior surface of the cylinder 2 is equipped with three fixed disks 4 installed in alternating fashion between the rotating disks 3. As depicted in FIGS. 2 and 3, the opposing surfaces 3a, 4a of rotating disks 3 and fixed disks 4 are equipped, respectively, with a plural number of depressions 31 and elevations 32 directed from the center to the circumference and the same plural number of radially emanating depressions 41 and elevations 42.

Powder inlet 5 and powder outlet 6 are installed at the respective ends of the cylinder 2. Through its rotation, the transport screw 7 formed in the circumference of axle 1 axially transports powder supplied through inlet 5 while at the same time feeding the powder into the gaps between the fixed disks 4 and rotating disks 3. Here, the powder between the opposing surfaces 3a and 4a of the two disks is subjected to a sliding-shear force, and consequently is intermixed, due to the depressions and elevations 31, 32 and 41, 42. The gap between a rotating disk 3 and a fixed disk 4 that is the gap between opposing surfaces 3a and 4a, is preferably on the level of 0.3 to 3 mm.

Using the closed multistage sliding-shear extruder with the structure described above, the method of the present invention for the preparation of powder mixtures is carried out as follows.

First, a heterogeneous powder comprising two or more different types of powders 8 is preliminarily mixed by stirring and is then introduced at inlet 5 while the rotating axle 1 is turning and is thereby axially transported within cylinder 2 by screw 7. When the heterogeneous powder comprising two or more different types of powders 8 passes between a rotating disk 3 and fixed disk 4, it is subjected to compressive and shearing forces, and consequently is efficiently intermixed, due to the sliding-shear effect generated between the depressions and elevations 31, 32 and 41, 42 formed on the opposing surfaces 3a and 4a. Furthermore, the heterogeneous powder 8 is repeatedly subjected to this sliding-shear action by virtue of sequential passage through the gaps in the multiple rotating disk 3/fixed disk 4 stages. As a consequence of this repeated action, a powder mixture 9 is discharged from outlet 6 in which the two or more types of powders have been microhomogeneously interdispersed. The sliding-shear extruder in FIG. 1 contains four rotating disk 3/fixed disk 4 stages, but approximately 2 to 10 stages can be used depending on the desired degree of microdispersity.

According to the present invention, a heterogeneous powder comprising two or more different types of powders is preliminarily mixed by stirring. The mixer used for this purpose may be any such device that is capable of macroscopically mixing the heterogeneous powder. Commercially available mixers that can be employed for this purpose are exemplified by a Henschel mixer with multiple blades installed on a rotating axle, a Turello mixer with wiping blades installed on a central axle, and dispersers installed at the sides, a Hobart and planetary mixers with a central rotor undergoes planetary movement while rotating, and kneaders with the rotation of two undulating screws.

Powders preferably mixed in accordance with the present invention are exemplified by the powders of inorganic pigments, metal oxides, metal hydroxides, organic pigments, organic resins, solid silicones, pearlescent substances, porous substances. carbon, metals, and biopolymers. In particular, the present invention provides a microhomogeneous interdispersion even when a very hard inorganic powder is mixed with a powder prepared from cured silicone rubber or silicone resin.

The inorganic pigments are exemplified by ultramarine blue, Prussian blue, manganese violet, titanium-coated mica, bismuth oxychloride, iron oxide (yellow, red, and black), iron hydroxide, titanium dioxide, low-order titanium oxide, and chromium hydroxide.

The metal oxides are exemplified by magnesium oxide, calcium oxide, aluminum oxide, silica, iron oxide, titanium oxide, low-order titanium oxide, zirconium oxide, chromium oxide, manganese oxide, cobalt oxide, and nickel oxide. The metal hydroxides are exemplified by magnesium hydroxide, calcium hydroxide, aluminum hydroxide, chromium hydroxide, and iron hydroxide. Composite metal oxides and composite metal hydroxides are exemplified by silica-alumina, iron titanate, cobalt titanate, lithium cobalt titanate, and cobalt aluminate.

The organic pigments are exemplified by Red #3, #104, #106, #201, #202, #204, #205, #206, #207, #220, #226, #227, #228, #230, and #405; Orange #203, #204, and #205; Yellow #4, #5, #205, and #401; and Blue #1 and #404.

The organic resins are exemplified by nylon resins, polystyrene resins, acrylic resins, methacrylic resins, polyester resins, titanium-coated nylon resins, and titanium-coated polyester resins.

The solid silicones are exemplified by cured silicone rubbers and silicone resins.

The pearlescent substances are exemplified by mica/titanium composite powders, mica/iron oxide composite powders, bismuth oxychloride, guanine, titanium oxynitride, low-order titanium oxide, and titanium-coated mica.

The porous substances are exemplified by phyllosilicate minerals such as kaolin, montmorillonite, clay mica, chlorite, and serpentine.; tectosilicate minerals such as zeolites.; silicate minerals such as pyrophyllite, talc, chrysotile, antigorite, lizardite, kaolinite, dickite, nacrite, halloysite, nontronite, saponite, sauconite, bentonite, natrolite, heulandite, stilbite, mesolite, scolecite, thomsonite, epistilbite, analcite, harmotome, phillipsite, chabazite, and gmelinite.; as well as muscovite, phlogopite, biotite, sericite, lepidomelane, lepidolite, lithia mica, zinnwaldite, and paragonite.

The metals and alloys are exemplified by iron, cobalt, nickel, copper, zinc, aluminum, chromium, titanium, zirconium, molybdenum, silver, indium, tin, antimony, tungsten, platinum, gold, and their alloys.

The biopolymers are exemplified by keratins such as human hair, animal hair, feathers, horns and hooves; and by collagen, cellulose, hemicellulose, pectin, chitin, chitosan, alginic acid, chondroitin, nucleic acid, and peptidoglucans.

EXAMPLE 1

10 kg titanium oxide of average particle size of 3 micrometers was stir-mixed with 1 kg iron oxide red of average particle size of 4 micrometers in a Henschel mixer at 1,000 rpm. This was followed by mixing in a closed multistage sliding-shear extruder equipped with 6 rotating disks which was a KCKD-d VEX6 from KCK Kabushiki Kaisha. The gap between the rotating and fixed disks in this extruder was set at approximately 1 mm, the rotation rate was set at 80 rpm, and the discharge rate was established at 20 kg/hour. A flesh-colored powder mixture was obtained by this additional mixing of the powder after the preliminary stir-mixing.

Comparison Example 1

A flesh-colored powder mixture was prepared by stir-mixing 10 kg titanium oxide of average particle size of 3 micrometers and 1 kg iron oxide red of average particle size of 4 micrometers in a Henschel mixer at 1,000 rpm.

Comparison Example 2

10 kg titanium oxide of average particle size of 3 micrometers was stir-mixed with 1 kg iron oxide red of average particle size of 4 micrometers in a Henschel mixer at 1,000 rpm and then additionally mixed in a colloid mill on a 1 mm disk gap to give a flesh-colored powder mixture.

Comparison Example 3

10 kg titanium oxide of average particle size of 3 micrometers was stir-mixed with 1 kg iron oxide red of average particle size of 4 micrometers in a Henschel mixer at 1,000 rpm. and 300 g of the resulting powder was further mixed in an automatic mortar for 3 hours to give a flesh-colored powder mixture.

Comparison Example 4

10 kg titanium oxide of average particle size of 3 micrometers was stir-mixed with 1 kg iron oxide red of average particle size of 4 micrometers in a Henschel mixer at 1,000 rpm and then further mixed in a Redige mixer for 1 hour to give a flesh-colored powder mixture.

Comparison Example 5

10 kg titanium oxide of average particle size of 3 micrometers was stir-mixed with 1 kg iron oxide red of average particle size of 4 micrometers in a Henschel mixer at 1,000 rpm, and 50 g of the resulting powder was additionally mixed in a ball mill with a capacity of 500 cc, and a ball diameter of 5 to 10 mm for 3 hours to give a flesh-colored powder mixture.

For each of the powder mixtures prepared in Example 1 and Comparison Examples 1 to 5, 27 g of the powder mixture was mixed with 3 g liquid paraffin (70 ) in a coffee mill and then press-molded at 30 kg/cm$^2$ to give a flesh-colored molding for evaluation. For each of the six moldings thus prepared, the surface of the molding was evaluated for the presence/absence of color variation and unevenness, and these results are reported in Table 1.

Comparison Example 6

A flesh-colored powder mixture was prepared by stir-mixing 10 kg talc of average particle size of 2 micrometers, 3 kg spherical cured silicone rubber powder of average particle size of 3.5 micrometers, 3 kg titanium oxide of average particle size of 3 micrometers, and 300 g iron oxide red of average particle size of 4 micrometers in a Henschel mixer at 1,000 rpm.

Comparison Example 7

A flesh-colored powder mixture was prepared by first stir-mixing 10 kg talc of average particle size of 2 micrometers, 3 kg spherical cured silicone rubber powder of average particle size of 3.5 micrometers, 3 kg titanium oxide of average particle size of 3 micrometers, and 300 g iron oxide red average particle size of 4 micrometers in a Henschel mixer at 1,000 rpm and by then additionally mixing in a colloid mill with the disk gap set to 1 mm.

Comparison Example 8

A flesh-colored powder mixture was prepared by first stir-mixing 10 kg talc of average particle size of 2 micrometers, 3 kg spherical cured silicone rubber powder average particle size of 3.5 micrometers, 3 kg titanium oxide of average particle size of 3 micrometers, and 300 g iron oxide red of average particle size of 4 micrometers in a Henschel mixer at 1,000 rpm and then additionally mixing 300 g of the resulting powder in an automatic mortar for 3 hours.

Comparison Example 9

A flesh-colored powder mixture was prepared by

TABLE 1

|  | Example 1 | Comp. Ex. 1 | Comp. Ex. 2 | Comp. Ex. 3 | Comp. Ex. 4 | Comp. Ex. 5 |
| --- | --- | --- | --- | --- | --- | --- |
| color variation | uniform color | large variation | slight variation | very slight variation | large variation | slight variation |
| unevenness | smooth | uneven, aggregation of the iron oxide red | smooth | smooth | uneven, aggregation of the iron oxide red | smooth |

As Table 1 shows, in Example 1 the two different powders of titanium oxide and iron oxide red had been so thoroughly interdispersed at the microscopic level that the surface of the corresponding molding presented far less color variation and unevenness than in Comparison Examples 1 to 5, and in fact had become uniform.

EXAMPLE 2

10 kg talc of average particle size of 2 micrometers, 3 kg spherical cured silicone rubber powder of average particle size of 3.5 micrometers, 3 kg titanium oxide of average particle size of 3 micrometers, and 300 g iron oxide red of average particle size of 4 micrometers were first stir-mixed in a Henschel mixer at 1,000 rpm and then further mixed in a closed multistage sliding-shear extruder equipped with 6 rotating disks which was a KCKD-d VEX6 from KCK Kabushiki Kaisha. The gap between the rotating and fixed disks in this extruder was set at approximately 1 mm, the rotation rate was set at 80 rpm, and the discharge rate was established at 20 kg/hour. A flesh-colored powder mixture was obtained by this additional mixing of the powder after the preliminary stir-mixing.

first stir-mixing 10 kg talc of average particle size of 2 micrometers, 3 kg spherical cured silicone rubber powder of average particle size 3.5 micrometers, 3 kg titanium oxide of average particle size of 3 micrometers, and 300 g iron oxide red of average particle size of 4 micrometers in a Henschel mixer at 1,000 rpm and then additionally mixing in a Redige mixer for 1 hour.

Comparison Example 10

A flesh-colored powder mixture was prepared by first stir-mixing 10 kg talc of average particle size of 2 micrometers, 3 kg spherical cured silicone rubber powder of average particle size of 3.5 micrometers, 3 kg titanium oxide of average particle size of 3 micrometers, and 300 g iron oxide red of average particle size of 4 micrometers in a Henschel mixer at 1,000 rpm and then additionally mixing 50 g of the resulting powder for 3 hours in a ball mill with a capacity of 500 cc, and a ball diameter of 5 to 10 mm.

For each of the powder mixtures prepared in Example 2 and Comparison Examples 6 to 10, 27 g of the powder mixture was mixed with 3 g liquid paraffin (70 ) in a coffee mill and then press-molded at 30 kg/cm² to give a flesh-colored molding for evaluation. For each of the six moldings thus prepared, the surface of the molding was evaluated for the presence/absence of color variation and unevenness, and these results are reported in Table 2.

TABLE 2

|  | Example 2 | Comp. Ex. 6 | Comp. Ex. 7 | Comp. Ex. 8 | Comp. Ex. 9 | Comp. Ex. 10 |
|---|---|---|---|---|---|---|
| color variation unevenness | uniform color smooth | large variation uneven, aggregation present | uniform color uneven | uniform color uneven | uniform color uneven, aggregation present | uniform color uneven |

As Table 2 shows, in Example 2 the four different powders of talc, spherical silicone rubber powder, titanium oxide, and iron oxide red had been so thoroughly interdispersed at the microscopic level that the surface of the corresponding molding presented far less color variation and unevenness than in Comparison Examples 6 to 10, and in fact had become uniform.

The present invention provides an efficient, continuous method and apparatus for the preparation of powder mixtures in which different types of powders are microhomogeneously interdispersed. This is achieved through the use of a multistage sliding-shear extruder and by passing a heterogeneous powder comprising two or more different types of powders preliminarily mixed by stirring through the cylinder of the extruder in order to subject the heterogeneous powder to a sliding-shear mixing action between the fixed and rotating disks that are installed in the multiple stages.

Other variations and modifications may be made in the method and apparatus described herein without departing from the essential features and concepts of the present invention. The forms of the invention described herein are exemplary only and are not intended as limitations on the scope of the invention as defined in the appended claims.

That which is claimed is:

1. A method of making a homogenous powder mixture from at least two heterogenous aggregable and non-aggregable powders in which at least two different powders are passed through a closed multistage sliding-shear extruder, the extruder including a cylinder in which is inserted a rotating axle having a transport screw on its circumference which extends along the length of the cylinder, a plurality of rotating disks each spaced at intervals and being concentrically attached to the axle, the cylinder including interior surfaces forming a plurality of fixed disks each arranged in alternating fashion between the rotating disks, the opposite surfaces of each of the rotating disks and the opposite surfaces of each of the fixed disks having alternating elevations and depressions extending radially from the center of the axle toward the circumference of the cylinder, the extruder including a powder inlet and a powder outlet, the rotating disks and the fixed disks each being spaced from one another to define gaps therebetween, the method comprising passing the two heterogeneous powders through the extruder from the inlet to the outlet, continuously mixing the two heterogenous powders in the extruder while subjecting the powders to compressive and shearing forces as the powders sequentially pass through the gaps, providing a homogenous blend of the two heterogenous powders upon exit of the powders from the cylinder, and withdrawing from the powder outlet a microhomogeneously interdispersed powder mixture.

2. The method according to claim 1 in which the powders are solids selected from the group consisting of inorganic pigments, metal oxides, metal hydroxides, organic pigments, organic resins, solid silicones, pearlescent substances, porous substances, carbon, metals, and biopolymers.

3. The method according to claim 2 in which the biopolymers are materials selected from the group consisting of human hair, animal hair, feathers, horns, hooves, collagen, cellulose, hemicellulose, pectin, chitin, chitosan, alginic acid, chondroitin, nucleic acid, and peptidoglucans.

4. The method according to claim 1 in which the gaps in the extruder are from 0.3 to 3.0 millimeters.

* * * * *